United States Patent [19]
Noyes

[11] Patent Number: 6,016,772
[45] Date of Patent: Jan. 25, 2000

[54] MULTIPLE FUNCTION COLLAR/HARNESS/ BELT/LEASH HAVING A COLLAPSIBLE CUP/BOWL PORTION

[76] Inventor: Thomas John Noyes, 3307 4th St., Boulder, Colo. 80304

[21] Appl. No.: 09/084,152

[22] Filed: May 26, 1998

[51] Int. Cl.[7] .............................. A45C 1/04; A01K 27/00; A01K 5/01
[52] U.S. Cl. .......................... 119/863; 224/664; D30/152; 119/61
[58] Field of Search ...................................... 119/863, 792, 119/793, 865, 856, 61; D3/627, 637; 224/587, 195, 606, 625, 664; D30/152, 153

[56] References Cited

U.S. PATENT DOCUMENTS

| | | | |
|---|---|---|---|
| D. 270,652 | 9/1983 | Winston | D21/196 |
| D. 312,712 | 12/1990 | Skwirz | D30/152 |
| 1,315,190 | 9/1919 | Nekarda . | |
| 4,091,766 | 5/1978 | Colliard . | |
| 4,762,087 | 8/1988 | Henecke | 119/61 |
| 4,811,695 | 3/1989 | Higgins . | |
| 5,184,762 | 2/1993 | Nevitt | 224/148 |
| 5,233,942 | 8/1993 | Cooper et al. | 119/792 |
| 5,441,017 | 8/1995 | Lindsay | 119/795 |
| 5,467,743 | 11/1995 | Doose | 119/864 |
| 5,505,355 | 4/1996 | Williams | 224/224 |
| 5,560,321 | 10/1996 | Hess | 119/858 |
| 5,632,235 | 5/1997 | Larsen et al. . | |
| 5,685,752 | 11/1997 | Fulton, Jr. | 441/90 |
| 5,878,698 | 3/1999 | Lyell | 119/863 |
| 5,890,809 | 4/1999 | Nelson | 224/581 X |

*Primary Examiner*—Peter M. Poon
*Assistant Examiner*—Yvonne R. Abbott
*Attorney, Agent, or Firm*—Earl C. Hancock; Francis A. Sirr; Holland & Hart LLP

[57] ABSTRACT

A multifunction collar, harness, belt or leash is provided having a accordion-fold portion that collapses to a thin shape when the collar, harness, belt or leash is in use and pulled to a taut or tight condition, and that expands when the collar, harness, belt or leash is released to a slack condition, the expanded accordion-fold portion then providing an open-top bowl or cup.

20 Claims, 3 Drawing Sheets

6,016,772

MULTIPLE FUNCTION COLLAR/HARNESS/BELT/LEASH HAVING A COLLAPSIBLE CUP/BOWL PORTION

BACKGROUND OF THE INVENTION

1. Field of the Invention

This invention relates to the field of collars, harnesses, belts or leashes, and more particularly to a collar, harness, belt or leash that includes a collapsible portion which may be expanded to provide an open top bowl or cup that is suitable for holding food, water, and the like.

2. Description of the Related Art

The general concept of providing multiple function collars and the like is known in the art.

For example, U.S. Pat. No. 2,680,315 to McHugh et al provides a transparent dog tag or dog license holder that is attached to a dog collar; U.S. Pat. No. 4,091,766 to Colliard provides a pet collar having a transparent tube that holds a reflective strip, an identification card, and an insecticide or a perfume; U.S. Pat. No. 4,218,991 to Cole provides a pet collar having a channel retainer that holds an identification strip; U.S. Pat. No. 5,233,942 to Copper et al provides a pet collar that includes a pouch for storing a leash; and U.S. Pat. No. 5,476,743 to Doose describes a pet collar having a pocket that is lined with one element of a Velcro-brand hook/loop fastener, so that upon opening the pocket, another item, such as a flag-type bib, having the other element of such a hook/loop fastener, may be releasably attached to hang from the pet collar.

In an attempt to provide additional utility to a collar/leash combination, U.S. Pat. No. 5,441,017 to Lindsay provides a pet leash that includes a container that holds a plurality of waste disposal bags.

Improvements in pet collars include U.S. Pat. No. 4,321,891 to Moeller wherein a collar of adjustable length is provided; U.S. Pat. No. 4,426,957 to Horrigan wherein a safety release dog collar includes a Velcro brand hook/loop retainer that responds to force, so as to release when a leash is not attached to the collar; and U.S. Pat. No. 4,811,695 to Higgins wherein an animal collar functions as a fixed circumference training collar or as a variable-circumference choke collar.

In addition, animal-type body harnesses of various types have been provided, as exemplified by U.S. Pat. Nos. 4,232,417, 5,184,762, 5,560,321 and 5,632,235.

While the prior art, as exemplified above, provides limited utility, the need remains in the art for a collar, harness, belt or leash having a portion that collapses to a thin shape when the collar, harness, belt or leash is pulled to a taut condition, and that expands when the collar, harness, belt or leash is placed in a slack condition, so that the expanded portion thereafter provides an open top bowl or cup that is suitable for use in holding food, water, and the like.

SUMMARY OF THE INVENTION

This invention provides a multifunction, strap or web type, collar, harness, belt or leash that includes a generally flexible and expandable portion that is comprised of a number of folds (i.e., an accordion fold portion) that extend in the direction of the longitudinal axis of the collar/harness/belt/leash. When the collar/harness/belt/leash is in use, the collar/harness/belt/leash is in a longitudinally taut or stressed condition, and this flexible/folded portion collapses to a form generally thin, narrow and long rectangular volume (i.e., it forms a thin collar-shape, a thin harness shape, a thin belt shape, or a thin leash shape). When the collar/harness/belt/leash is not in use, or when it is released from longitudinal stress, the flexible/folded portion expands in a direction generally normal to the longitudinal axis of the collar/harness/belt/leash, or the flexible folded portion is manually expanded in this manner. In this expanded condition, the flexible/folded portion provides an open top bowl or cup.

A preferred utility and object of this invention is to provide a pet collar, an animal collar, a pet leash or an animal leash that not only allows an animal to be identified and/or restrained by the use of a collar that encircles the neck, or perhaps the body of the animal, or by the use of a leash that attaches to such a collar, but also provides a foldable cup or foldable bowl having utility in feeding and/or watering the animal. While in a preferred embodiment of the invention the foldable cup/bowl whereby the animal may be fed and/or watered is formed as a non-removable portion of a collar/harness/belt/leash, it is within the spirit and scope of this invention to removably attach the foldable cup/bowl to the collar/harness/belt/leash.

In addition, while the preferred utility of this invention relates to use with animals, the invention also finds utility as a new and unusual harness/belt that can be used by humans in any conventional harness/belt manner, and that can also be selectively used to provide a cup or a bowl as needed.

These and other objects, advantages and features of this invention will be apparent to those of skill in the art upon reference to the following detail description of the invention, which description makes reference to the drawing.

DESCRIPTION OF THE PREFERRED EMBODIMENT

The following detailed description will mainly relate to an embodiment of the invention that comprises a pet collar, such as a dog collar. However, since this invention finds utility in connection with animal leashes and both animal and human belts, harnesses, and the like, the details of the following description that relates to a dog collar are not to be taken as a limitation on the spirit and scope of this invention.

Figure 1:
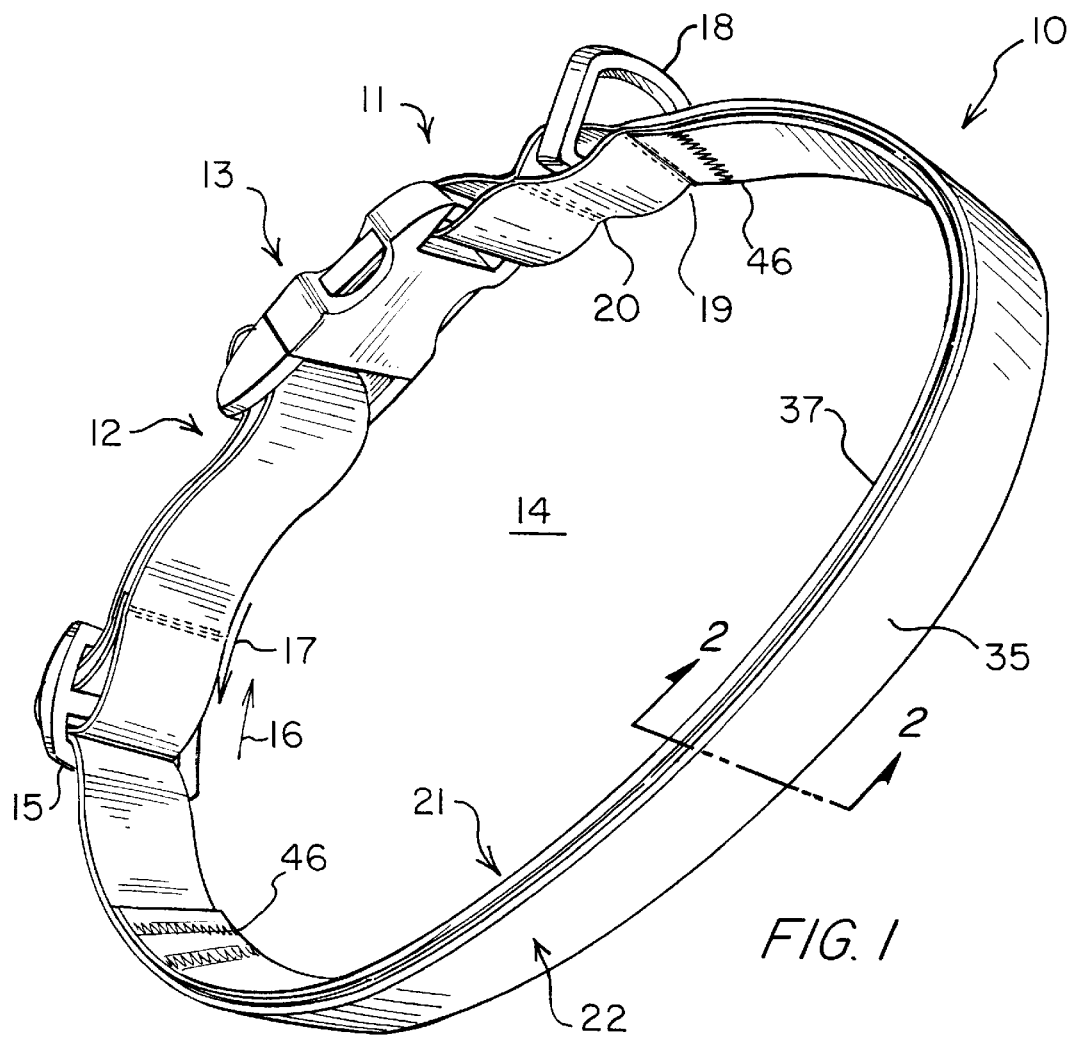
FIG. 1 is a perspective view of a collar/harness/belt embodiment of the present invention, the collar/harness/belt being shown in a closed condition wherein, for example, the collar forms a loop that encircles the neck of an animal.

FIG. 1 is a perspective view of a strap, or web-type dog collar 10, that is constructed and arranged in accordance with the present invention. In FIG. 1, collar 10 is shown in a closed condition as it would be when encircling the neck of a dog. In order to selectively and manually secure the two opposite end portions 11 and 12 of collar 10 together, to thereby form a neck encircling loop 14, the respective end portions 11, 12 are provided with mating male/female members of a well-known plastic clasp 13; for example, a clasp 13 of the type that is shown in above-mentioned U.S. Pat. No. 5,467,743. As will be apparent to those of skill in the art, a collar/harness/belt in accordance with this invention may utilize other well-known clasps 13, an example being well-known belt buckles.

As is apparent, loop 14 includes an inner side 21 that is adapted to lie adjacent to the neck of a dog, and an outer side 22 that may be exposed to snagging by bushes and the like as the dog explores its environment.

While a preferred embodiment of dog collar 10 includes a releasable clasp 13, it is within the spirit and scope of this invention to provide a closed loop collar/belt/harness that includes a stretchable length that facilitates placement of the collar/belt/harness on the human, or animal body part that is being encircled.

Also, a leash in accordance with this invention, comprises an elongated strap 10 having a manually operable snap at one end thereof that is adapted to be connected to a D ring that is carried by an animal collar. In addition, such a leash usually includes a hand loop at the other end thereof. In this embodiment of the invention, the accordion fold cup/bowl (to be described in detail) is collapsed to its thin shape, and the two ends thereof, and perhaps the inner fold are attached to a similar length of the leash.

The strap, web or belt material from which a collar/harness/belt/leash 10 is made is not critical to the invention. A relatively thin, flexible, and inelastic belt-like fabric is preferred, and various attachments can be achieved by stitching, stapling, gluing, and/or the melting of plastic web material from which collar 10 is formed. As an example, collar 10 is an elongated web, or belt, that is formed of a Nylon brand fabric webbing. Other materials, such as fabric, leather and/or flexible plastics is also usable.

In making the collar 10 embodiment of this invention, one end portion 12 of collar web 10 is first threaded through two parallel slots that are provided by a well-known slidable and rectangular-shaped plastic clip 13. This web end is then threaded through the male member of plastic clasp 13, whereupon the web end is threaded to encircle and be attached to the center post member of plastic clip 15, all of this being of well-known construction. The axial length of collar 10 can now be adjusted to suit the neck size of a dog merely by sliding plastic clip 15 in the direction 16 in order to reduce the size of loop 14, or plastic clip 15 can be moved in the direction 17 in order to increase the size of loop 14.

The opposite end portion 11 of collar web 10 is first threaded through a plastic D ring 18, then threaded through the female member of plastic clip 13, whereupon this web end is attached to itself generally at point 19. In order to secure plastic D ring 18 in a given axial position along collar 10, another point of web-to-web attachment 20 may be provided. Again, this construction and arrangement of the end portion 11 of collar 10 is well known. As is well known, D ring 18 provides utility for attachment of a leash, a chain restraint, a lead line, or the like.

Figure 4:
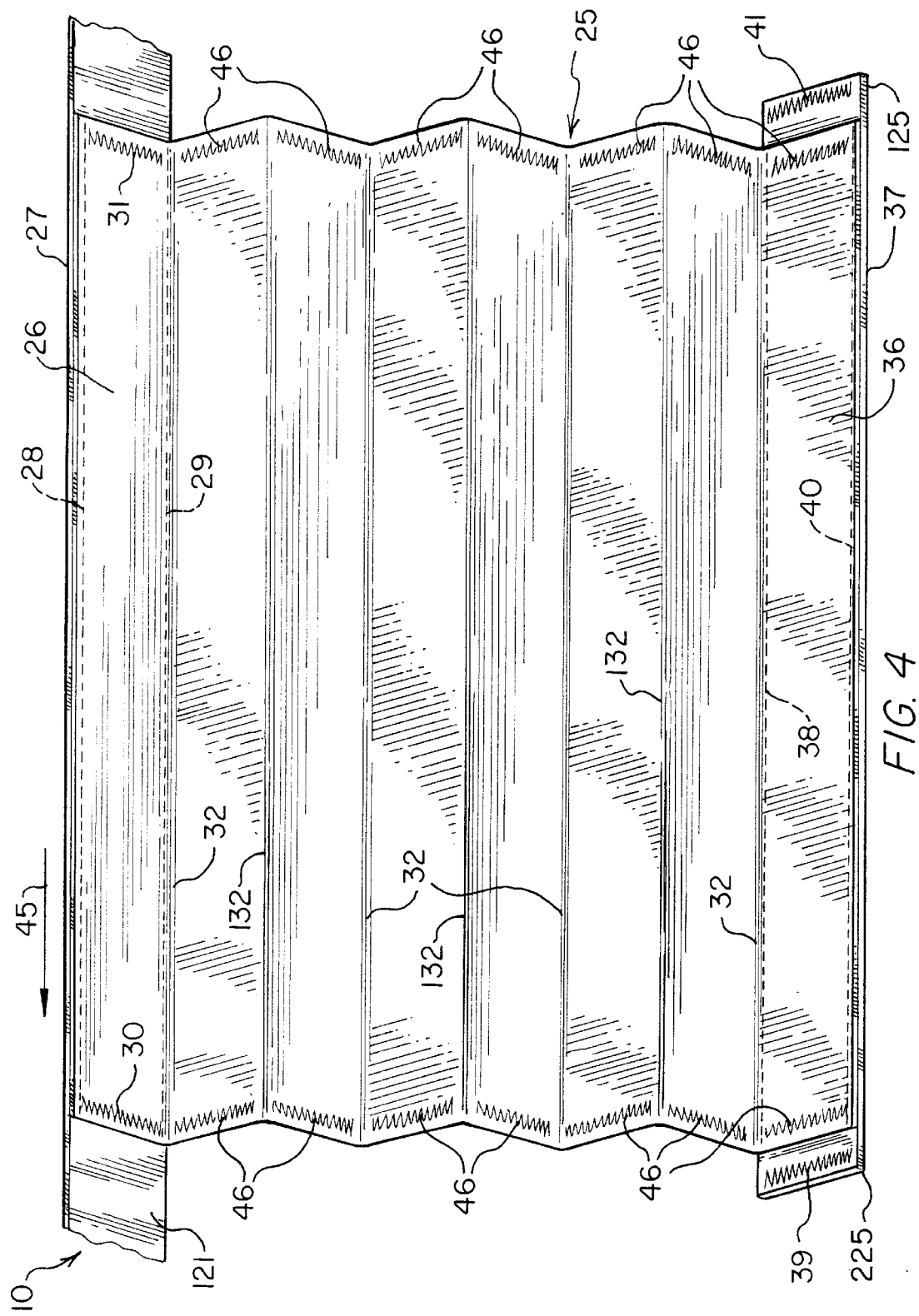
FIG. 4 is a plan view of the unfolded piece of thin, generally waterproof, and relatively flexible material that when accordion folded, comprises the accordion folded cup/bowl of a collar/harness/belt/leash in accordance with the present invention.

With reference to FIG. 4, this figure shows the plan view of the unfolded piece of a relatively thin, flexible, generally waterproof, and cloth-like material 25 whose top edge portion 26 is stitched to the adjacent portion 27 of the inside surface 121 of collar web 10 by way of the four stitch lines that are indicated by dotted lines 28–31, and that generally form a rectangular stitch area. This portion 27 of collar web 10 serves the purpose of stiffening the upper edge portion 26 of relatively thin material 25.

Figure 2:
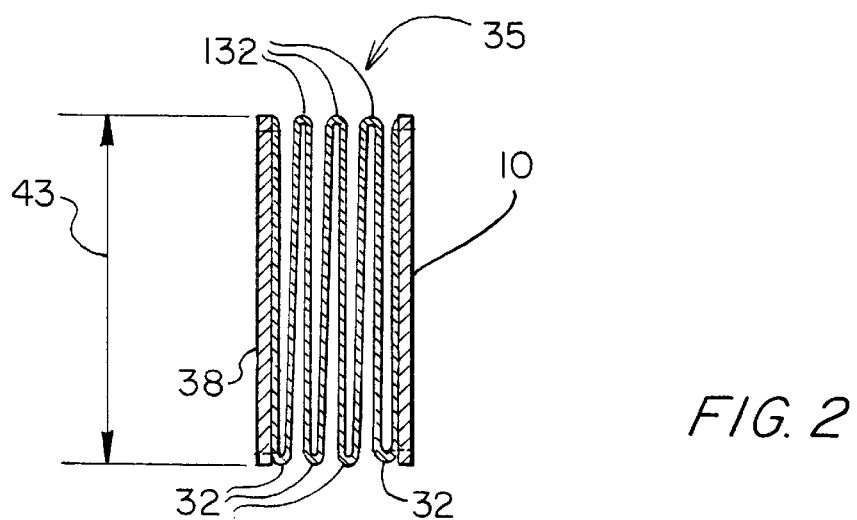
FIG. 2 is a cross-section view taken on the line 2—2 of FIG. 1 showing the folded condition of the cup/bowl that is formed as a portion of a collar/harness/belt/leash in accordance with the invention.

Material 25, when accordion folded along parallel fold lines 32, 132 forms the accordion folded cup/bowl 35 of the present invention, best seen in FIGS. 1 and 2, this accordion folded cup/bowl 35 having utility when used with a wide variety of collars, belts, harnesses or leashes.

In FIG. 4, the four fold lines that are designated as 32 are folded downward, whereas the three fold lines that are designated 132 fold upward. As a result, a four-fold accordion fold is provided, as best shown in the cross-section view of FIG. 2.

While not critical to the invention, in this embodiment of the invention as shown, a construction and arrangement is provided wherein cup bowl 35 resides on the inside 21 of the collar loop 14 that is shown in FIG. 1. This arrangement tends to better protect collapsed cup/bowl 35 from snagging by bushes, or the like, as the dog moves about and explores its environment, as would occur if the cup/bowl were on the exterior surface or side of the collar.

Material 25 is generally water resistant, or rubberized, and may, for example, comprise rip stop Nylon brand fabric. Of course, within the spirit and scope of this invention, other materials may be used, including a rubber of rubber-like material that is molded to a similar accordion shape.

In accordance with a feature of the invention, the bottom edge portion 36 of material 25 carries a length 37 of collar web material, the length 37 of collar web being attached to the bottom edge portion 36 of material 25 by way of stitching 38–41, this stitching being similar to the stitching 28–31 that is provided for top edge portion 26. This length 37 of collar material again serves to stiffen the bottom edge portion 36 of relatively thin material 25.

When the length of material 25, shown in FIG. 4, has been accordion folded along lines 32, 132, the two collar opposite ends 125, 225 of folded material 25 are secured together by way of a multiple stitch areas that is designated as 46 in FIGS. 1, 2 and 4. In this manner, a collapsible, open top, cup/bowl 35 is formed having an accordion fold construction.

Figure 3:
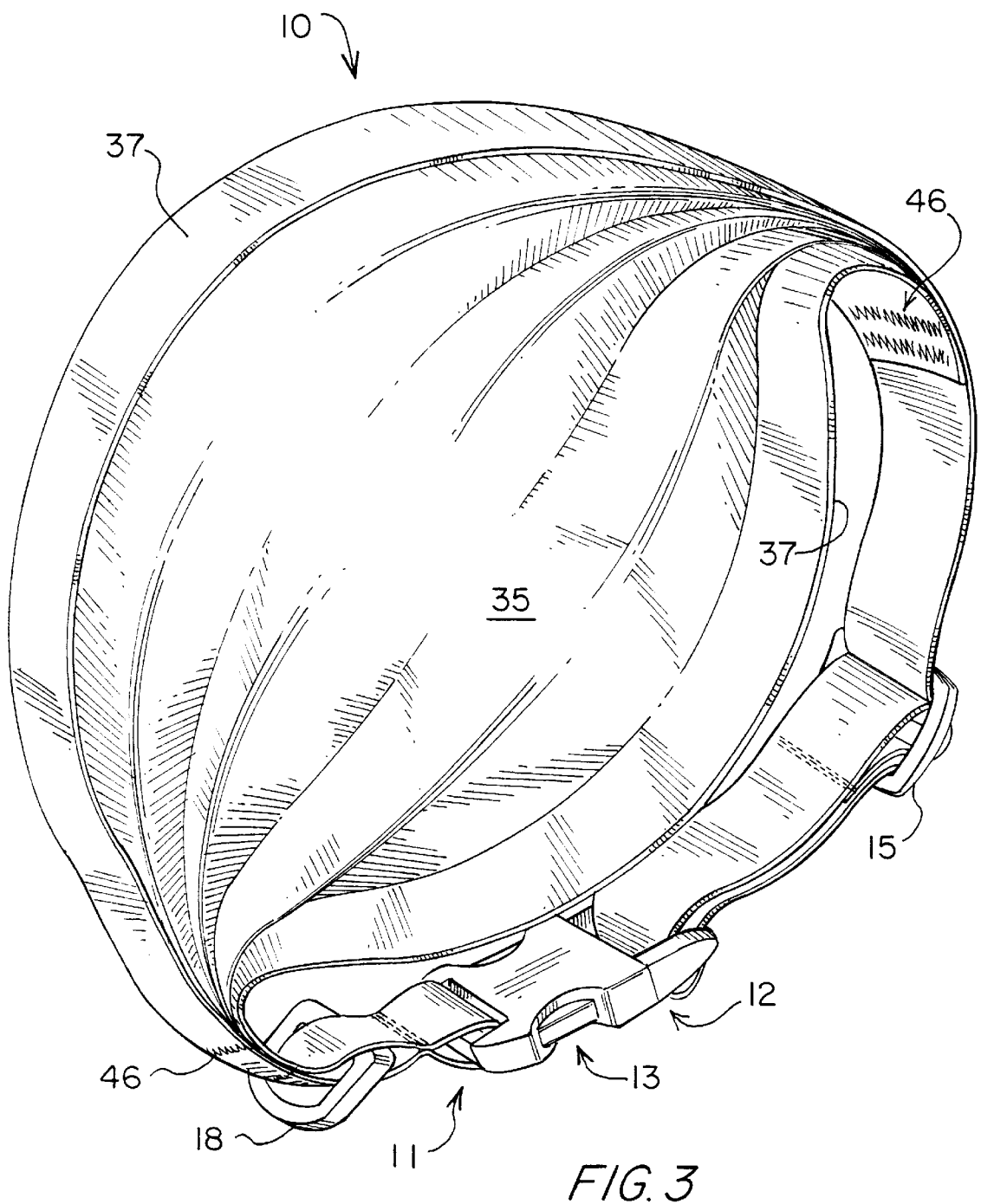
FIG. 3 is a perspective view of the collar/harness/belt of FIG. 1 wherein the collar/belt has been removed from the animal, and wherein the cup/bowl portion has been manually expanded to form an open top cup or bowl.

The location of cup/bowl 35 along the axial length 45 of collar web 10 is not critical to the invention. As seen in FIGS. 1 and 3, in an embodiment of the invention, one axial end of cup/bowl 35 was located adjacent to the collar end that included plastic D ring 18.

FIG. 3 shows web 10 that forms a portion of a leash 10, or shows web 10 as it would be when collar 10 of FIG. 1 has been removed from a dog's neck. In FIG. 3, cup/bowl portion 35 has been manually expanded to form an open top cup/bowl having utility, such as feeding, watering or the like. Web 10 is shown in FIG. 3 with collar clasp 13 engaged to form a closed loop. Cup/bowl portion 35 is also operable for use when collar 10 clasp 13 is not engaged and collar 10 is in an elongated condition, such as when web 10 of FIG. 3 comprises a portion of a leash 10.

While not critical the invention, in the described dog collar embodiment of the invention, collar 19 had an un-looped axial length 45 that was adjustable in the range of from about 16½ inch to about 18½ inch, and had a height 43 (see FIG. 2) of about 1.0-inch.

This invention has been described in detail while making reference to an embodiment of the invention that comprised a dog or pet collar. However, since this invention has other utilities, and since those skilled in the art will, upon reading this description of the invention, readily visualize yet other embodiments that are within the spirit and scope of this invention, the forgoing detailed description is not to be taken as a limitation on the spirit and scope of this invention.

What is claimed is:

1. In combination:

an elongated strap having an inside surface, an outside surface, and two opposite ends that respectively carry mating clasp means enabling said strap to be formed into a closed loop with said inside surface forming said closed loop;

a length of an accordion folded material having an inner fold, an outer fold, a first accordion fold end, and a second accordion fold end;

first means binding said first accordion fold end;

second means binding said second accordion fold end; and means attaching said first and second accordion fold ends and said inner fold along a corresponding length of a surface of said strap.

2. The combination of claim 1 wherein said accordion folded material comprises a flexible material, wherein said corresponding length of a surface of said strap provides stiffening for said inner fold, and including:

a length of a stiffening material attached to said outer fold.

3. The combination of claim 1 wherein said first and second accordion fold ends and said inner fold are attached along a corresponding length of said inside surface of said strap.

4. The combination of claim 3 wherein said accordion folded material comprises a relatively thin and flexible material, wherein said corresponding length of said inner surface of said strap provides stiffening for said inner fold, and including:

a length of a stiffening material attached to said outer fold.

5. An animal harness having additional utility in the feeding and/or watering of an animal, comprising:

an elongated harness strap adapted to encircle a portion of the body of an animal, said harness strap having an inside surface and two opposite ends that respectively carry mating clasp means enabling said harness strap to be formed into a closed loop with said inside surface being adjacent to the portion of the body of the animal;

an elongated length of an accordion folded material having an inner fold and outer fold; and means attaching said inner fold to a surface of said harness-strap;

whereby said outer fold may be moved away from said inner fold to form an open top cup, or bowl, having utility in the feeding and/or watering of the animal.

6. The animal harness of claim 5 including:

a length of stiffening material attached to said outer fold.

7. The animal harness of claim 6 wherein said inner fold is attached to said inside surface of said harness-strap.

8. The animal harness of claim 7 including:

first means associated with said elongated harness strap providing for adjustment of a length of elongation of said elongated harness strap; and second means associated with said elongated harness strap providing for attachment of a lead line or the like.

9. A pet collar, comprising:

an elongated web having an inside surface, an outside surface, and two opposite ends that respectively carry mating clasp means enabling said elongated web to be formed into a closed loop with said inside surface forming said closed loop;

a length of an accordion folded material having an inner-fold, an outer-fold, a first accordion fold end, and a second accordion fold end;

first means binding said first accordion fold end;

second means binding said second accordion-fold-end; and means attaching said first and second accordion fold ends and said inner fold along a corresponding length of a surface of said elongated web.

10. The pet collar of claim 9 wherein said accordion folded material comprises a flexible material, wherein said corresponding length of a surface of said elongated web provides stiffening for said inner fold, and including:

a length of a stiffening material attached to said outer fold.

11. The pet collar of claim 9 wherein said first and second accordion fold ends and said inner fold are attached along a corresponding length of said inside surface of said elongated web.

12. The pet collar of claim 11 including:

first means associated with said elongated web providing for adjustment of a length of elongation of said elongated web; and second means associated with said elongated web providing for attachment of a pet leash or the like;

the pet collar having utility in the feeding and/or watering of a pet, such that upon removal of the pet collar from a pet, said outer fold may be moved away from said inner fold to form an open top cup or bowl having for use in feeding and/or watering the pet.

13. A closed loop harness adapted to encircle a portion of the body of a human or an animal, comprising:

an elongated and closed loop harness having an inside surface and an outside surface;

a length of an accordion folded material having an inner fold, an outer fold, a first bound accordion fold end, and a second bound accordion fold end; and means attaching said first and second bound accordion-fold-ends and said inner-fold along a corresponding length of a surface of said harness whereby said accordion folded material is openable into a cup or bowl configuration.

14. The closed loop harness of claim 13 wherein said accordion folded material comprises a flexible material, wherein said corresponding length of a surface of said harness provides stiffening for said inner fold, and including:

a length of a stiffening material attached to said outer fold.

15. The closed-loop harness of claim 13 wherein said first and second bound accordion fold ends and said inner fold are attached to a corresponding length of said inside surface of said harness.

16. The closed loop harness of claim 15 wherein said accordion folded material comprises a relatively thin and flexible material, wherein said corresponding length of said inner surface of said harness provides stiffening for said inner-fold, and including:

a length of a stiffening material attached to said outer fold.

17. A leash, comprising:

an elongated strap having first and second ends and first and second elongated surfaces extending between said first and second ends;

a length of an accordion folded material having an inner fold, an outer fold, a first bound accordion fold end, and a second bound accordion fold end; and means attaching said first and second bound accordion fold ends and said inner fold along a length of one of said elongated surfaces of said strap that generally corresponds to said length of said accordion folded material with said attaching means positioned relative to said surface for accommodating opening of said accordion folded material into a cup or dish configuration.

18. The leash of claim 17 wherein said accordion folded material comprises a flexible material, wherein said corresponding length of said strap provides stiffening for said inner-fold, and including:

a length of a stiffening material attached to said outer fold.

19. A pet collar, comprising:

an elongated web having an inside surface, an outside surface, and two opposite ends that respectively carry mating clasp means enabling said elongated web to be formed into a closed loop with said inside surface forming the inside surface of said closed loop;

a length of an accordion folded material having an inner fold, an outer fold, a first accordion fold end, and a second accordion fold end;

first means binding said first accordion fold end;

second means binding said second accordion fold end; and means attaching said first and second accordion fold ends along a corresponding length of one of said surfaces of said elongated web.

20. The pet collar of claim 19 wherein said accordion folded material comprises a flexible material, and including:

a length of stiffening material attached to said inner fold; and a length of a stiffening material attached to said outer fold.

* * * * *